United States Patent
Patel et al.

(10) Patent No.: US 8,959,160 B2
(45) Date of Patent: Feb. 17, 2015

(54) METHOD AND APPARATUS FOR DISPLAYING A MESSAGE INTENDED FOR DIFFERENT RECIPIENTS

(75) Inventors: Virat G. Patel, Des Plaines, IL (US); Yu-Chia E. Chang, Palatine, IL (US); Wojciech Klimczak, Lancut (PL); Matthew R. Nakoneczny, Seattle, WA (US)

(73) Assignee: Motorola Solutions, Inc., Schaumburg, IL (US)

( * ) Notice: Subject to any disclaimer, the term of this patent is extended or adjusted under 35 U.S.C. 154(b) by 573 days.

(21) Appl. No.: 12/850,303

(22) Filed: Aug. 4, 2010

(65) Prior Publication Data

US 2012/0036196 A1   Feb. 9, 2012

(51) Int. Cl.
*G06F 15/16* (2006.01)
*G06Q 10/10* (2012.01)

(52) U.S. Cl.
CPC ................................ *G06Q 10/107* (2013.01)
USPC ........... 709/206; 709/201; 709/202; 709/231; 709/234

(58) Field of Classification Search
USPC .......................... 709/206, 201, 202, 231, 234
See application file for complete search history.

(56) References Cited

U.S. PATENT DOCUMENTS

| | | | |
|---|---|---|---|
| 6,539,421 B1 | 3/2003 | Appleman et al. | |
| 2003/0032409 A1 | 2/2003 | Hutcheson et al. | |
| 2008/0034114 A1* | 2/2008 | Ducey et al. ................... | 709/238 |
| 2008/0133302 A1* | 6/2008 | Brauninger et al. ............. | 705/8 |
| 2010/0009653 A1* | 1/2010 | Shkolnikov et al. ........... | 455/405 |
| 2011/0066687 A1* | 3/2011 | Chen et al. .................... | 709/206 |

* cited by examiner

*Primary Examiner* — Lan-Dai T Truong
(74) *Attorney, Agent, or Firm* — Valerie M. Davis (57) ABSTRACT

A method and apparatus for displaying a message destined for different recipients, wherein the apparatus programs a computer to perform the method, which includes: determining that a message is destined for a first recipient and a second recipient; determining a message size limit for the message based on capabilities of a first device used by the first recipient and a second device used by the second recipient; displaying a first portion of the message in a first format when a length of the message is less than the message size limit; displaying a next portion of the message in a second different format when the length of the message exceeds the message size limit.

19 Claims, 8 Drawing Sheets

METHOD AND APPARATUS FOR DISPLAYING A MESSAGE INTENDED FOR DIFFERENT RECIPIENTS

TECHNICAL FIELD

The present disclosure relates generally to messaging systems, and in particular to a method and apparatus for displaying a message intended for different recipients.

BACKGROUND

A messaging system enables a user to compose a message on a messaging device and send the message to one or more recipients. Also, the messaging system enables a user (also interchangeably referred to as a messaging user) to reply to and forward messages. Oftentimes, a messaging user composes a single message and targets the message to multiple recipients. In such cases, at least some of the intended recipients may use different types of receiving devices to receive and view the message. These receiving devices can differ in the amount of characters that can be received by and/or displayed on these receiving devices, resulting in some of the recipients receiving and viewing the whole message and other recipients only receiving and viewing part of the message. In this scenario, it becomes challenging for a messaging user to assess and compose a message that will be a "fit" for each destination.

Accordingly, there is a need for a method and apparatus that displays a message intended for different recipients.

BRIEF DESCRIPTION OF THE FIGURES

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for displaying a message intended for different recipients, for example, a first recipient and a second recipient. The method includes determining that the message is destined for the first recipient and the second recipient, determining a message size limit for the message based on capabilities of a first device used by the first recipient and a second device used by the second recipient, displaying a first portion of the message in a first format when a length of the message is less than the message size limit, and displaying a next portion of the message in a second different format when the length of the message exceeds the message size limit. Those skilled in the art will realize that the above recognized advantages and other advantages described herein are merely illustrative and are not meant to be a complete rendering of all of the advantages of the various embodiments of the present disclosure.

Figure 1:
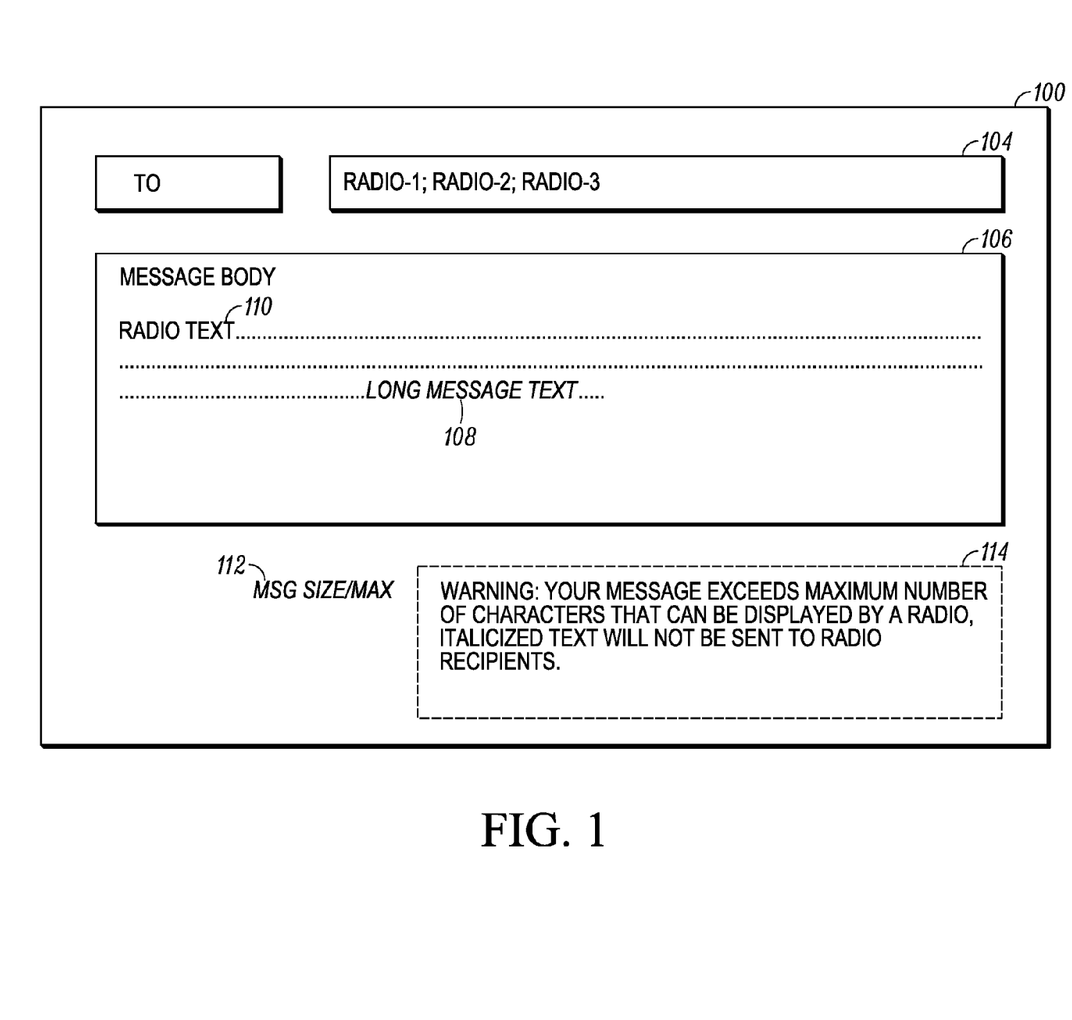
FIG. 1 illustrates a message structure in accordance with some embodiments.

Referring now to the drawings, and in particular FIG. 1, an illustrative message structure 100 in accordance with the present disclosure is shown. The message structure is composed in a messaging device, usually at least in part by a user of the device. A message body 106 (also referred to herein as a message) of the message structure includes a first portion 110 displayed in a first format, which in this case is Times New Roman font size 12, and a second portion 108 displayed in a different format, in this case Times New Roman Italic font size 9. As used herein, format means the appearance of the characters of the message.

This message is targeted or destined for three recipients: Radio-1, Radio-2, and Radio 3, as shown in and determined from a "To" Field 104. Additional recipients can be determined from other fields such as Bcc or Cc fields. In accordance with the present teachings, a message size limit is determined based on capabilities and/or device type of devices used by the intended recipients of the message 106. The capabilities of the recipients' devices include or indicate a number of characters that can be received by and/or displayed by the device (which is based on device type, for example, such as whether the device is a radio, text messaging device, computer, PDA, etc.), and the message size limit for the message is defined herein as a formatting dividing point between a first portion and a next portion of the message.

At least two of the three receiving radio devices differ in maximum message size limit, which is defined as the maximum amount of characters a device can display. Accordingly, in one illustrative implementation, the message size limit for the message 106 is determined by: determining a maximum message size limit for each of the three devices, and setting the message size limit as the smallest of the maximum message size limits of the three receiving radio devices. In one embodiment, the capabilities of the devices are determined based on an address or address type for each recipient device and/or recipient. In a more particular implementation, a device type for each of the devices is determined, and the capabilities of the devices are determined based on the device type. Moreover, the device type is determined based on an address or address type of each recipient and/or the recipient device. The capabilities, device types, addresses, address types, and maximum message size limits can be determined, for example, using tables, mappings, databases, etc., stored in or otherwise accessible to the messaging device used to create the message 106.

In this illustrative message structure 100, because the message size (of the message body 106) exceeds the determined message size limit for the three receiving radios, embodiments of the present disclosure can be used to communicate to the user of the messaging device that the second portion 108 of the message cannot be received by and/or displayed on some of the receiving radios. Accordingly, the first portion 110 and the second (next) portion 108 of the message 106 are displayed in different formats to indicate to the messaging user that the second portion 108 will not be displayed on and/or sent to some of the receiving radios.

Furthermore, a warning is provided (which in this case is displaying a warning message 114) when the length of the message exceeds the message size limit to indicate or inform the user that the second portion of the message will not be displayed by one of the devices and, therefore, will not be received by and shown to some of the recipients; and/or to indicate that the second portion of the message will not be sent to those recipients having devices that will not display that portion of the message. More particularly, the warning indicates that the second portion 108 of the message 106 will not be sent to and/or displayed by the recipient device(s) having the smallest maximum message size limit. Thus, in a further illustrative implementation, only the first portion 108 of the message is sent to devices with the smallest maximum message size limit; and the first portion 108 and second portion 110 of the message is sent to the remaining devices. A size indicator 112 shows the message size and the message size limit of the current message.

FIGS. 2-5 each illustrate a flow diagram showing a method for displaying a message destined for different recipients in accordance with the teachings herein and that, when implemented by a messaging device, generates a message structure similar to message structure 100. FIGS. 2-5 show the method being performed in response to various user actions, for example: a user creating a new message with the messaging device; a user opening an existing message with the messaging device; a user inputting into the messaging device one or more addresses for recipients of the message or deleting one or more recipient addresses; a user creating a reply message using the messaging device.

In order for the messaging device to impose formatting and size rules in accordance with the teachings herein, for example, in accordance with the methods described by reference to FIG. 2 to FIG. 5, the messaging device has to be "aware" of or know about the device capabilities and/or device types. In one embodiment, this is provided through provisioning of the messaging device with certain information, tables, and/or mappings. In one example implementation, a server allows an administrator to configure different device types supported by the system and the corresponding maximum message size limit supported by that device. The server provides this device type-to-maximum message size limit "rules matrix" to the messaging device via a suitable configuration distribution mechanism, e.g., xml files over an out-of-band file synchronization mechanism that is tailored to the type of device.

All devices and users can be pre-provisioned in the system for access control means so that only the configured devices are allowed to use the services of the system. The device type of a device can either be pre-provisioned into the system and/or provided dynamically during registration. For example, for provisioning during registration, a presence service function in the system maintains a mapping between the user and his or her device, wherein the user/device pair is further associated with an address or address type. When a device registers with the system, the presence server is updated with a device identifier (ID) for the device and optionally also the device type for the device (if not provided during registration, the type configured statically is used).

When a user logs into the system, it again registers with the presence service. At this time, the mapping between user and device is confirmed via an explicit reference of the device ID in the user's registration message. This mapping of the user-device ID-device type is pushed to the server, which pushes the mapping to the messaging device. Another mapping can include a mapping table of address or address type to maximum message size limit, wherein the address or address type is associated with a given type of device. A default maximum message size limit could be used for unknown address types. Address types include, but are not limited to, an email address for the user, an email address for the device, a static email alias, etc. Mappings could also be stored for specific recipient and/or device addresses. With these mappings, the messaging device performs message formatting in accordance with the teachings herein.

Figure 2:
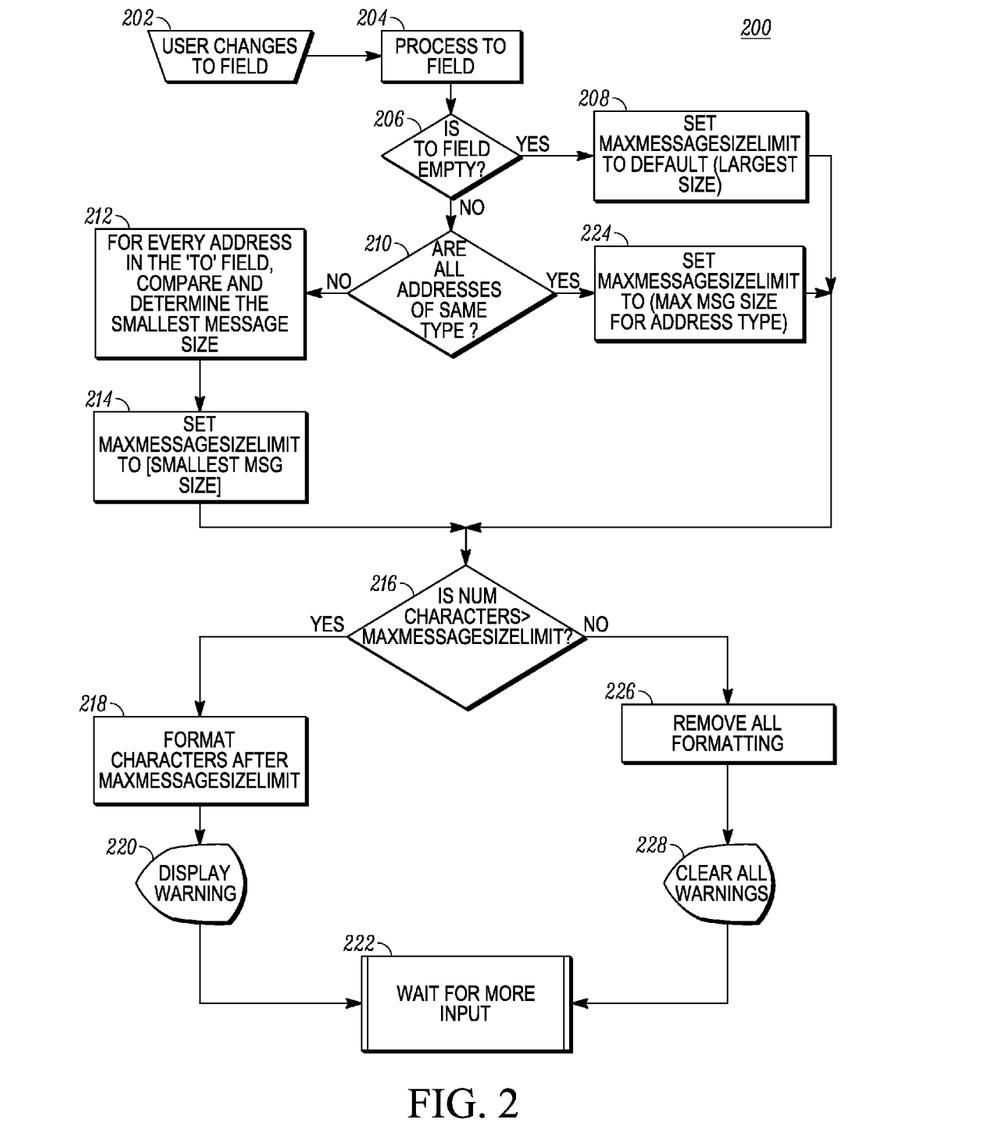
FIG. 2 is a logical flowchart illustrating a method in accordance with some embodiments.

FIG. 2 illustrates a method 200 for displaying a message in one or more formats in accordance with the present disclosure. For example, method 200 is performed in response to a user inputting a recipient address into the messaging device, which is displayed in the To field of the message structure, or deleting a recipient address. The method 200, which is performed in a messaging device (e.g., a messaging device 800 in FIG. 8), starts at 202, where a messaging user makes changes to the To Field of the message by adding and/or removing recipients, wherein the To Field is used for determining the recipients to which the message is destined. At 204, each recipient address in the To Field of the message is examined and the corresponding receiving device type of the recipient address is determined It should be noted that in addition to the "To" field where the recipients of the message are listed, other fields can specify recipients to which the message is destined such as, a Cc or Bcc field, to name a few. In addition, the device's capabilities, such as maximum message size limit, for each device type are retrieved from one or more data tables (not shown) residing in a computer memory of the messaging device or in databases. The data tables contain the mapping information between device type, device capabilities, address or address type. Such mapping information may be established on a computer, stored in a database or file, and loaded to the messaging devices.

At 206, the To Field of the message is checked to see whether it is empty. If the To Field of the message is empty, execution then transitions to 208. At 208, the message size limit (i.e., MaxMessageSizeLimit in FIG. 2) is set to a large default size, which is larger than any receiving device's maximum message size limit. After 208, execution of the method 200 transitions to 216. Turning back to 206, if the To Field of the message is not empty, execution then transitions to 210. At 210, whether all the recipient addresses in the To Field of the message are of a same type is determined. If all the recipient addresses in the To Field of the message are of a same type, execution transitions to 224. At 224, the message size limit is set to the maximum message size limit (i.e., MaxMessageSizeLimit in FIG. 2) of the same type of receiving devices of all the recipients in the To Field of the message. After 224, execution transitions to 216. Turning back to 210, if the recipient addresses in the To Field of the message are of different types, execution transitions to 212. At 212, the smallest size of the maximum message sizes of all the types of receiving devices of the recipients in the To Field of the message is determined by number comparison operations. Thereafter, the determined smallest size in 212 is set to the message size limit (i.e., MaxMessageSizeLimit in FIG. 2) in 214. After 214, execution transitions to 216.

At 216, the number of characters of the message body text is compared to the message size limit (i.e., MaxMessageSizeLimit in FIG. 2). If the number of characters of the message is bigger than the message size limit, execution of the method 200 transitions to 218. At 218, the characters of the message body text after the message size limit (i.e., MaxMessageSizeLimit in FIG. 2) are formatted and displayed in a different format from that of the characters of the message within the message size limit. The first portion of the message consists of the characters within the message size limit, while the next portion of the message (which can be the remaining portion of the message) consists of characters after the message size limit. As a result of 218, the first and second portions of the message text are displayed in different formats to the messaging user. The formats differ in at least one of font, color, and size of the message characters. For example, the first portion of the message is displayed in Times New Roman font of size 12, while the second portion is displayed in Times New Roman Italic font of size 9. Alternatively, for instance, the second portion of the message may be shown in strikethrough or underlined format.

After 218, execution transitions to 220, where a warning is displayed. The warning indicates to the messaging user that the length of the message has exceeded the message size limit, and the remaining portion of the message displayed in the second format will not be sent to any recipient whose receiving device having a maximum message size limit the same as or smaller than the message size limit. The warning may be an intrusive message, such as a popup message box, or a nonintrusive message, such as a message displayed in a text field. Moreover, the warning can include an audible sound such as a beep, tone, recorded warning message or any other suitable audible warning. After the warning message is displayed, execution transitions to 222, where the messaging device waits for more input from the messaging user.

Turning back to 216, if the number of characters of the message is the same as or smaller than the message size limit, execution of the method 200 transitions to 226. At 226, the message is displayed in a single format, which indicates to the messaging user that the whole message will be sent to each recipient in the To Field of the message. Also, all warning messages are cleared at 228, and execution of the method 200 transitions to 222 where the messaging device waits for additional input.

Figure 3:
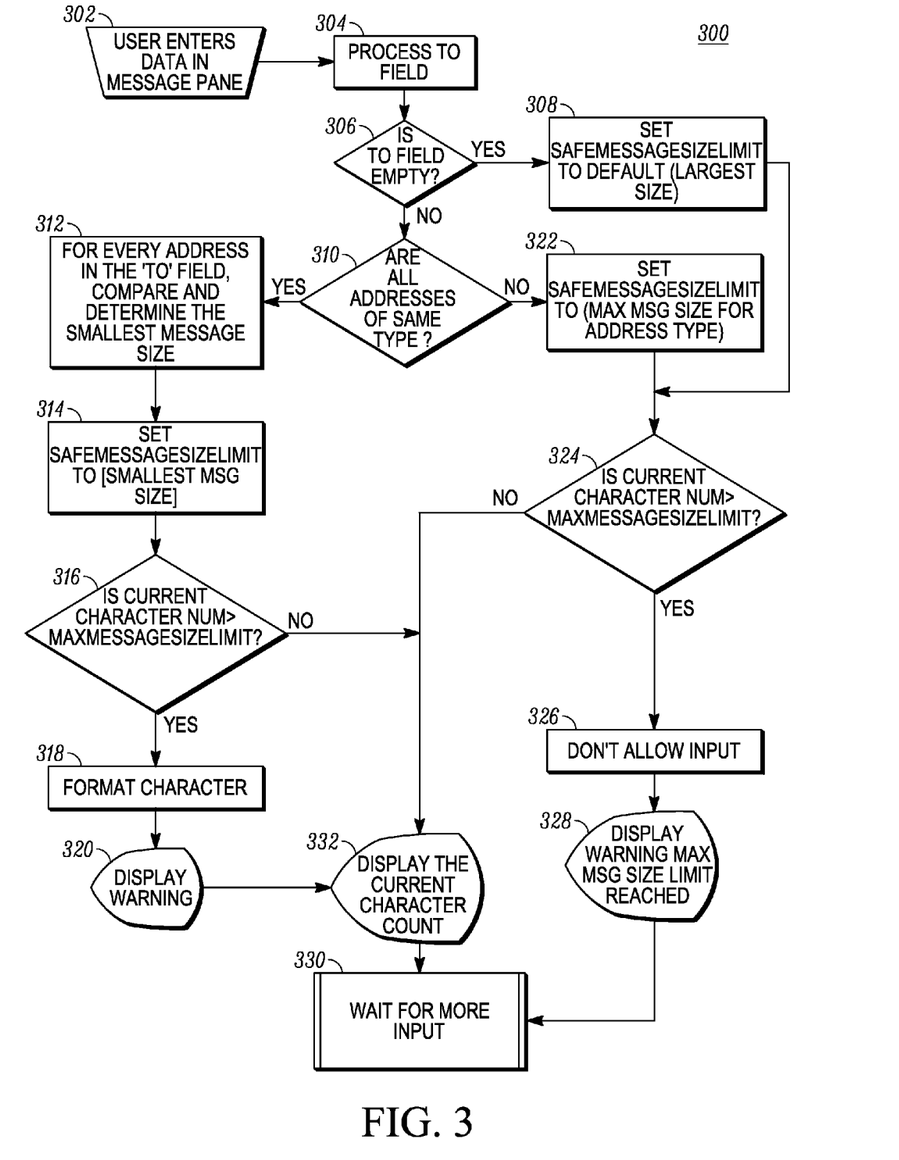
FIG. 3 is a logical flowchart illustrating a method in accordance with some embodiments.

Turning now to FIG. 3, a method 300 for displaying a message in one or more formats, while a messaging user edits the message, is shown in accordance with the present disclosure. The method 300 is performed in a messaging device (e.g., a messaging device 800 in FIG. 8). Method starts at 302, where the messaging user enters or deletes data in the message pane of the message. At 304, each recipient address in the To Field of the message is examined and the corresponding receiving device type of the recipient address is determined. In addition, the device's capabilities, such as maximum message size limit, for each device type are retrieved from one or more data tables (not shown) residing in a computer memory of the messaging device or databases.

At 306, the To Field of the message is checked to see whether it is empty. If the To Field of the message is empty, execution then transitions to 308. At 308, the message size limit (i.e., SafeMessageSizeLimit in FIG. 3) is set to a large default size, which is bigger than any receiving device's maximum message size limit. After 308, execution of the method 300 transitions to 324. Turning back to 306, if the To Field of the message is not empty, execution transitions to 310. At 310, whether all the recipient addresses in the To Field of the message are of a same type is determined. If all the recipient addresses in the To Field of the message are of a same type, execution transitions to 322. At 322, the message size limit is set to the maximum message size limit (i.e., MaxMessageSizeLimit in FIG. 3) of the same type of receiving devices of all the recipients in the To Field. After 322, execution transitions to 324.

At 324, the number of characters of the message body text is compared to the message size limit (i.e., MaxMessageSizeLimit in FIG. 3). If the number of characters of the message is bigger than the message size limit, execution of the method 300 transitions to 326, where no further user input is allowed. Thereafter, execution of the method 300 transitions to 328, where a warning message is displayed to the messaging user. The warning message indicates to the messaging user that the message size limit has been reached, and no more input is allowed. Execution transitions to 330, after 328, where the messaging device waits for more input from the messaging user. Turning back to 324, if the number of characters of the message is not bigger than the message size limit, execution of the method 300 transitions to 3. At 332, the current character count of the message, i.e., the message size, is displayed. Execution then transitions to 330.

Turning back to 310, if the recipient addresses in the To Field of the message are of different types, execution transitions to 312. At 212, the smallest size of the maximum message sizes of all the types of receiving devices of the recipients in the To Field of the message is determined by number comparison operations. Thereafter, the determined smallest size in 312 is set to the message size limit (i.e., SafeMessageSizeLimit in FIG. 3) in 314. After 314, execution transitions to 316.

At 316, the number of characters of the message body text is compared to the message size limit (i.e., MaxMessageSizeLimit in FIG. 3). If the number of characters of the message is bigger than the message size limit, execution of the method 300 transitions to 318. At 318, the characters of the message body text after the message size limit are formatted and displayed in a different format from that of the characters of the message within the message size limit. The first portion of the message consists of the characters within the message size limit, while the next (e.g., remaining) portion of the message consists of the characters after the message size limit. As a result of 318, the first and second portions of the message text are displayed to the messaging user in different formats.

After 318, execution transitions to 320, where a warning is displayed. The warning indicates to the messaging user that the length of the message has exceeded the message size limit, and the remaining portion of the message displayed in the second format will not be sent to any recipient whose receiving device having a maximum message size limit same as or smaller than the message size limit. After the warning message is displayed, execution transitions to 332 and then 330. Turning back to 316, if the number of characters of the message is not bigger than the message size limit, execution of the method 300 transitions to 332, and then 330.

Figure 4:
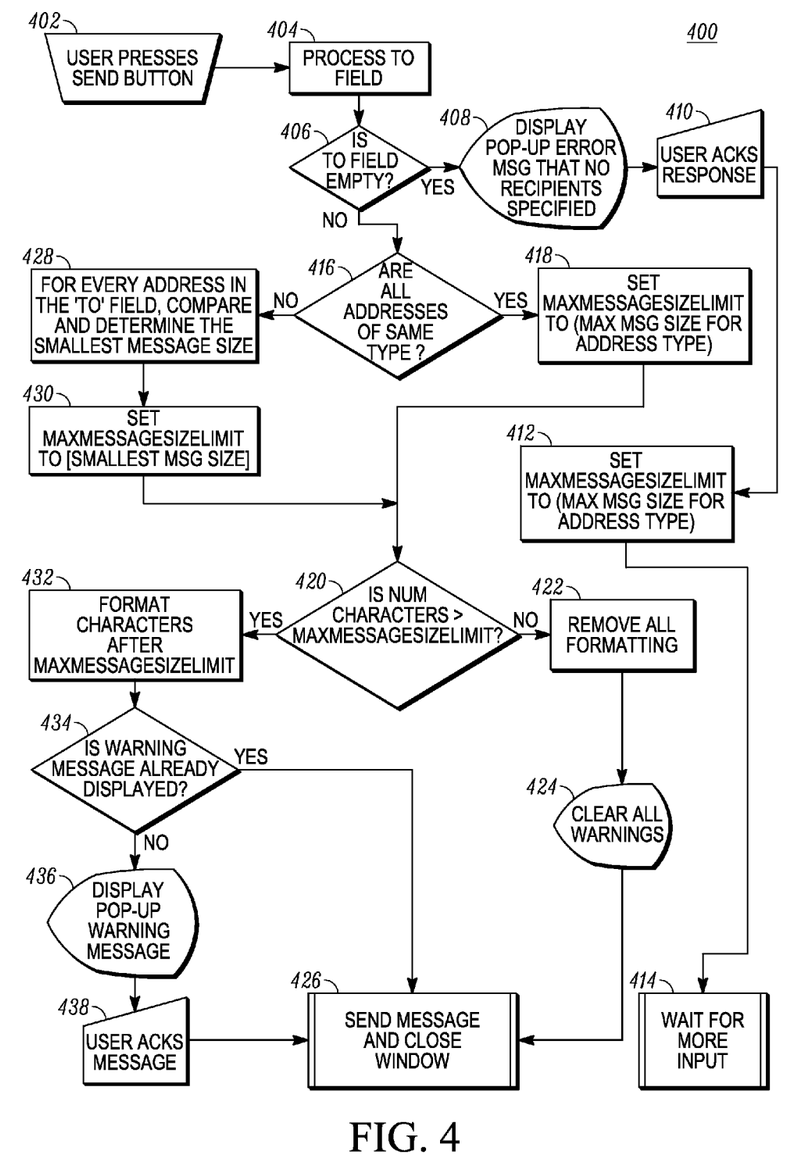
FIG. 4 is a logical flowchart illustrating a method in accordance with some embodiments.

FIG. 4 illustrates a method 400 for displaying a message in one or more formats in accordance with the present disclosure. The method 400 performed in a messaging device (e.g., a messaging device 800 in FIG. 8) starts at 402, where the messaging user presses a Send button to send the message. At 404, each recipient address in the To Field of the message is examined and the corresponding receiving device type of the recipient address is determined. In addition, the device's capabilities, such as maximum message size limit, for each device type are retrieved from one or more data tables (not shown) residing in a computer memory of the messaging device or databases.

At 406, the To Field of the message is checked to see whether it is empty. If the To Field of the message is empty, execution then transitions to 408, where a popup message is displayed, indicating to the messaging user that there are no recipients in the To Field of the message. After the messaging user acknowledges the popup message at 410, execution transitions to 412. At 412, the message size limit (i.e., MaxMessageSizeLimit in FIG. 4) is set to a large default size, which is bigger than any receiving device's maximum message size limit. After 412, execution of the method 400 transitions to 414, where the messaging device waits for more input from the messaging user.

Turning back to 406, if the To Field of the message is not empty, execution then transitions to 416. At 416, whether all the recipient addresses in the To Field of the message are of a same type is determined. If all the recipient addresses in the To Field of the message are of a same type, execution transitions to 418. At 418, the message size limit (i.e., MaxMessageSizeLimit in FIG. 4) is set to the maximum message size limit of the same type of receiving devices of all the recipients in the To Field of the message. After 418, execution transitions to 420. Turning back to 416, if the recipient addresses in the To Field of the message are of different types, execution transitions to 428. At 428, the smallest size of the maximum message sizes of all the types of receiving devices of the recipients in the To Field of the message is determined by number comparison operations. Thereafter, the determined smallest size in 428 is set to the message size limit (i.e., MaxMessageSizeLimit in FIG. 4) in 430. After 430, execution transitions to 420.

At 420, the number of characters of the message body text is compared to the message size limit. If the number of characters of the message is not bigger than the message size limit, execution of the method 400 transitions to 422. At 422, the message is displayed in a single format, which indicates to the messaging user that the whole message will be sent to each recipient in the To Field of the message. All warning messages are cleared at 424, and execution of the method 200 transitions to 426, where the message is sent to each targeted recipient of the message, and the message window is closed.

Turning back to 420, if the number of characters of the message is bigger than the message size limit (i.e., MaxMessageSizeLimit in FIG. 4), execution of the method 400 transitions to 432. At 432, the characters of the message body text after the message size limit (i.e., MaxMessageSizeLimit in FIG. 4) are formatted and displayed in a different format from that of the characters of the message within the message size limit. The first portion of the message consists of the characters within the message size limit, while the next (e.g., remaining) portion of the message consists of the characters after the message size limit. As a result of 432, the first and second portions of the message text are displayed to the messaging user in different formats.

After 432, execution transitions to 434, where whether a warning message is currently being displayed is determined. If a warning message is currently being displayed, execution of the method 400 transitions to the step 426. Otherwise, execution transitions to 436, where a popup message is displayed, indicating to the messaging user that the characters of the message displayed in the second format will not be sent or displayed to some of the recipients of the message. After the messaging user acknowledges the popup warning message at 438, the message is sent to each recipient at the step 426.

Figure 5:
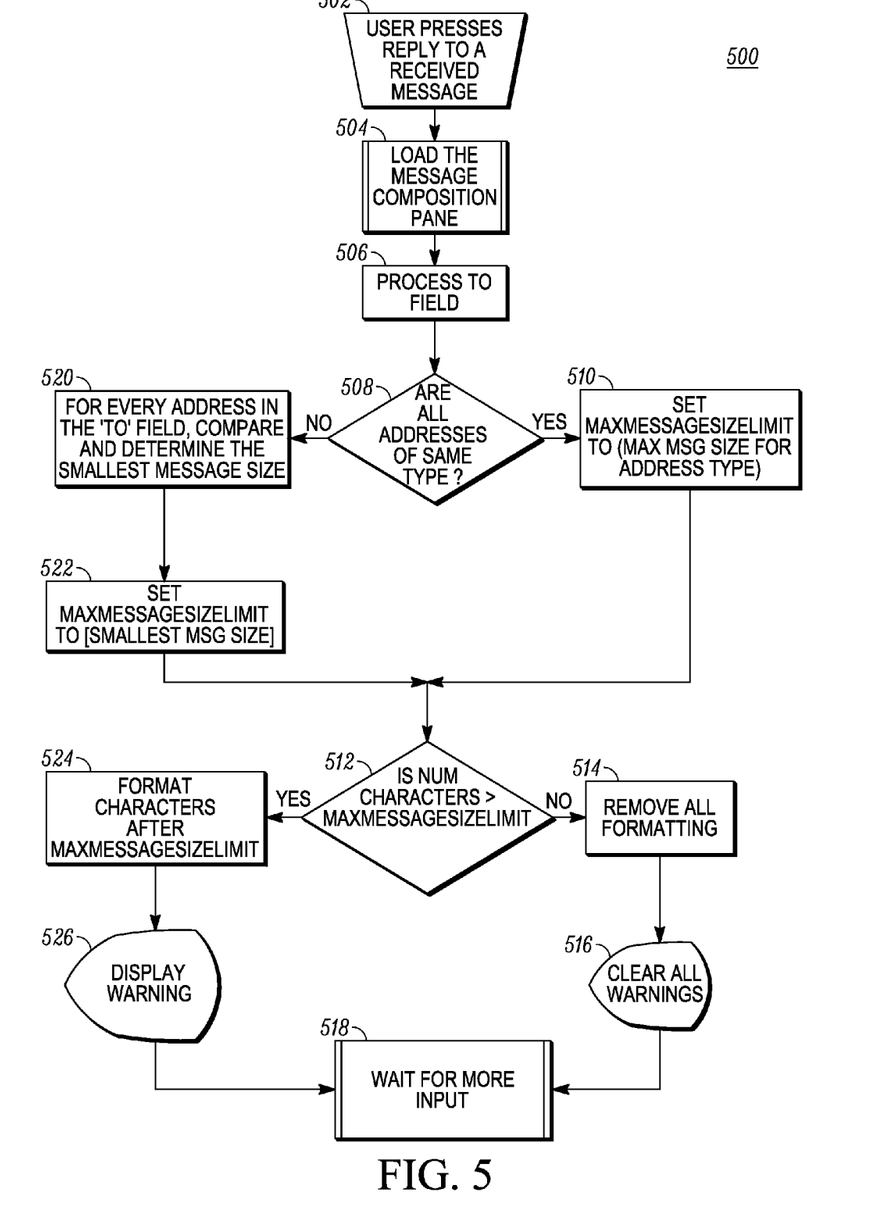
FIG. 5 is a logical flowchart illustrating a method in accordance with some embodiments.

Referring to FIG. 5, a method 500 for displaying a message in one or more formats, when a messaging user replies to the message, is shown in accordance with the present disclosure. The method 500 performed in a messaging device (e.g., a messaging device 800 in FIG. 8) starts at 502, where the messaging user presses a Reply button. At 504, the replied message is loaded and opened, with the message body shown in the message composition pane and the replied recipients shown in the To Field of the message. At 506, each recipient address in the To Field of the message is examined and the corresponding receiving device type of the recipient address is determined. Moreover, the device's capabilities, such as maximum message size limit, for each device type are retrieved from one or more data tables (not shown) residing in a computer memory of the messaging device or databases.

At 508, it is determined whether all the recipient addresses in the To Field of the message are of a same type. If all the recipient addresses in the To Field of the message are of a same type, at 510, the message size limit is set to the maximum message size limit (i.e., MaxMessageSizeLimit in FIG. 5) of the same type of receiving devices of all the recipients in the To Field of the message. After 510, execution transitions to 512. Turning back to 508, if the recipient addresses in the To Field of the message are of different types, at 520, the smallest size of the maximum message sizes of all the types of receiving devices of the recipients in the To Field of the message is determined by number comparison operations; and the determined smallest size in 212 is set to the message size limit (i.e., MaxMessageSizeLimit in FIG. 5) in 522. After 522, execution transitions to 512.

At 512, the number of characters of the message body text is compared to the message size limit (i.e., MaxMessageSizeLimit in FIG. 5). If the number of characters of the message is not bigger than the message size limit, at 514, the message is displayed in a single format, which indicates to the messaging user that the whole message will be sent to each recipient in the To Field of the message. In addition, all warning messages are cleared at 516, and execution of the method 500 transitions to 518, where the messaging device waits for more input from the messaging user. If the number of characters of the message is bigger than the message size limit in 512, execution of the method 500 transitions to 524, where the characters of the message body text after the message size limit are formatted and displayed in a different format from that of the characters of the message within the message size limit. The first portion of the message consists of the characters within the message size limit, while the next (e.g., remaining) portion of the message consists of the characters after the message size limit. As a result of 524, the first and second portions of the message text are displayed to the messaging user in different formats.

After 524, execution transitions to 526, where a warning is displayed. The warning indicates to the messaging user that the length of the message has exceeded the message size limit, and the remaining portion of the message displayed in the second format will not be sent to any recipient whose receiving device has a maximum message size limit the same as or smaller than the message size limit. The warning may be an intrusive message, such as a popup message box, or a nonintrusive message, such as a message displayed in a text field. After the warning message is displayed, execution transitions to 518. It should be observed that the method 500 may also be performed on a messaging device when a messaging user forwards a message.

Figure 6:
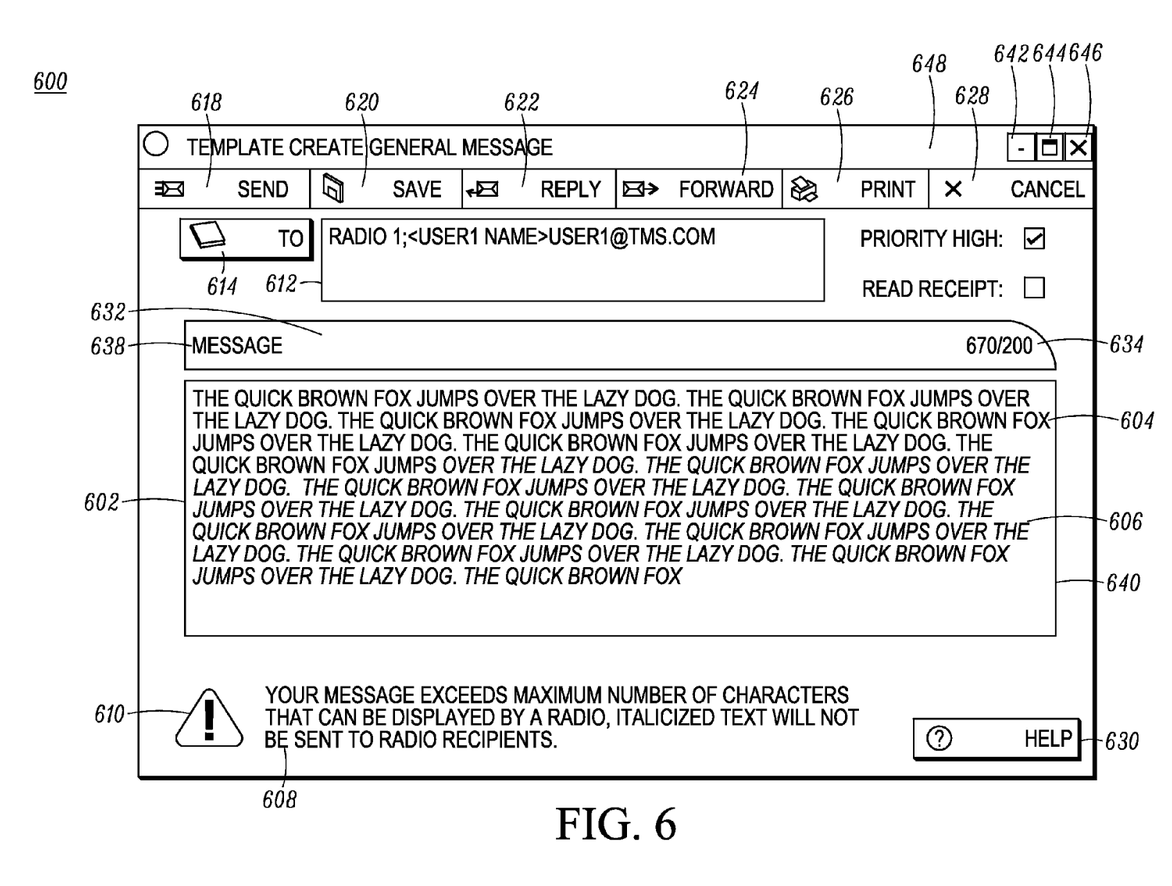
FIG. 6 illustrates a message being composed in a messaging device implementing the methods shown in FIGS. 2-5, and showing a warning message.
Figure 7:
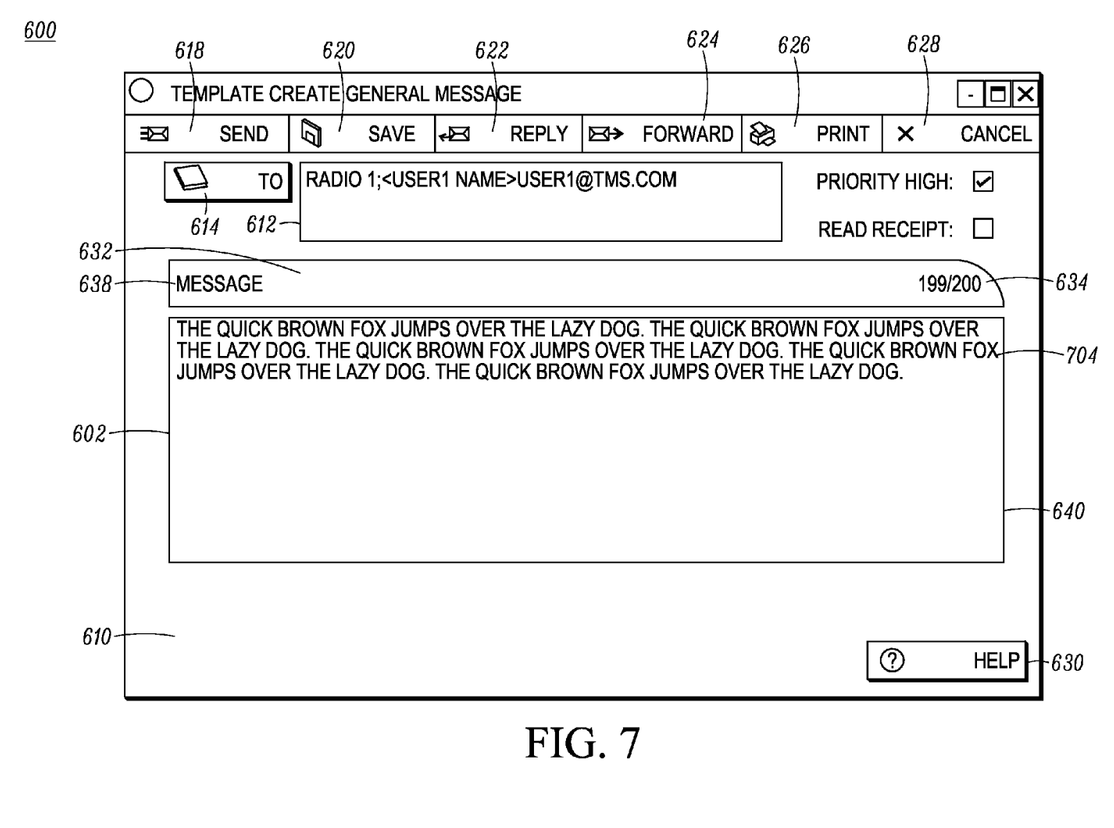
FIG. 7 illustrates a message being composed in a messaging device implementing the methods shown in FIGS. 2-5, and showing the whole message in a single format.

FIGS. 6-7 each illustrate a message being composed in a messaging device implementing the methods shown in FIGS. 2-5. Referring in particular to FIG. 6, a messaging system 600 comprises a number of functional buttons, including the Minimize 642, Maximize 644, Close 646, To 614, Send 618, Save 620, Reply 622, Forward 624, Print 626, Cancel 628, and Help 630 buttons. The Minimize 642, Maximize 644, and Close 646 buttons are placed in a title bar 648. Clicking any of these buttons will trigger the corresponding function, appreciated by a person of ordinary skill in the art. For example, clicking the To button 614 will bring up an address book allowing the messaging user to select recipients for the message. In the particular embodiment of FIG. 6, a To Field 612 includes two recipients, "Radio 1" and "user1@tms.com."

The maximum message size limit of "Radio 1" is 200, which is smaller than that of the receiving device of recipient "user1@tms.com." Accordingly, a message size limit is set to 200. A message pane 602 comprises a message pane header 632 and a message body 640. A message pane header text 638, "Message," is shown on the left side of the message pane header 632, while a size indicator 634 is shown on the right side of the message pane header 632. The size indicator 634 shows the current message size and the message size limit.

The message body 640 has a length of 670, which is bigger than the message size limit. Accordingly, the message body 640 is divided into two portions, a first portion 604 of length 200 and a second portion 606 of length 470. The first portion 604 of the message body 640 is shown in Times New Roman font of size 12 and color black, and the second portion 606 of the message body 640 is shown in Times New Roman Italic font of size 9 and color gray. In addition, a warning message 608 is shown to notify the messaging user that the message body 640 exceeds the message size limit, and the characters of the second portion 606 of the message body 640 will not be sent and displayed to the recipient "Radio 1". The exclamation mark 610 is provided to make the warning 608 more noticeable to the messaging user. Referring to FIG. 7, substantially the same messaging system 600 (of FIG. 6) is shown, except the message size limit 636 is 200, and a message body 740 has a length of 199, which is smaller than the message size limit. Accordingly, the whole message body 740 is displayed in a single format. Further, no warning message is displayed.

Figure 8:
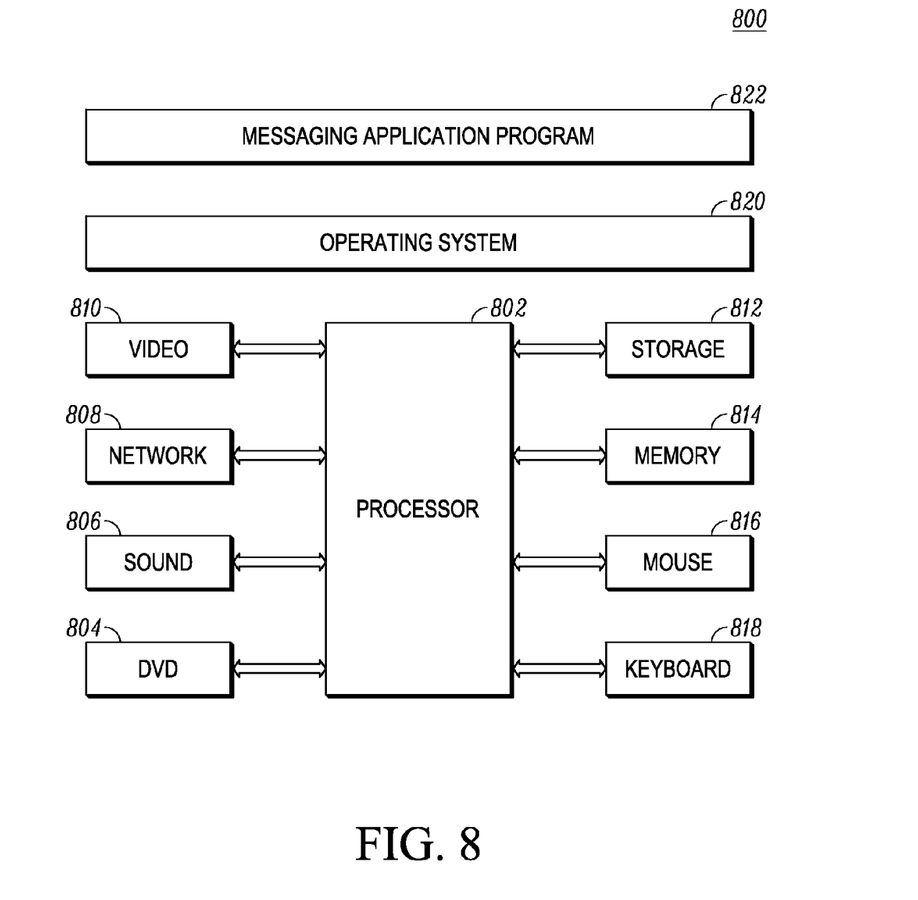
FIG. 8 illustrates a block diagram of a messaging device in accordance with some embodiments.

FIG. 8 illustrates a messaging device 800 that is adapted to perform the methods of FIGS. 2-5, and implement the embodiments of FIGS. 6-7. The messaging device 800 comprises a messaging application program 822, running on top of an operating system 820. One or more layers of software may exist between the messaging application program 822 and the operating system 820. For example, the messaging application program 822 may be implemented in C# computer language and runs in a .NET Framework environment (not shown), and the .NET Framework environment exists as a layer between the messaging application program 822 and the operating system 820. The messaging application program 822 is adapted to allow a messaging user to manage, create, read, edit, reply, and send messages. Further, the messaging application program 822 is adapted to implement the messaging systems of FIGS. 6-7, as well as the methods of FIGS. 2-5.

The messaging device 800 further comprises a processor 802, which is often referred to as a central processor unit or CPU. The processor 802 communicates with various system components, including a video 810, sound 806, DVD or CD-ROM drive 804, mouse 816, keyboard 818, storage 812, and memory 814 component. The processor 802 communicates with recipients and other systems through a network 808 component. The messaging application program 822 is stored in storage 812. When the messaging application program 822 is requested to be launched, it is loaded into memory 814 and executed therein by the processor 802.

In one particular embodiment, the messaging device 800 is a computer with a 2 GHz processor 802, 40 GB storage 812, 1 GB memory 814, 100 MB/sec Ethernet network interface 808, 1024×768 video adapter and monitor 810, DVD drive 804, basic sound card with speakers 806, Internet Explorer 5.5 (not shown), .NET Framework version 1.1 (not shown), and Windows XP SP 2 operating system 820. Furthermore, in this particular embodiment of the messaging device 800, the messaging application program 822 is an ASTRO® 25 Trunking IV&D Text Messaging Service Client application.

Persons of skill in the art will understand that this disclosure may be extended to other embodiments than those specifically disclosed herein. In the foregoing specification, specific embodiments have been described. However, one of ordinary skill in the art appreciates that various modifications and changes can be made without departing from the scope of the disclosure as set forth in the claims below. For example, in some embodiments, the second portion 606 of the message body 640 in FIG. 6 may be displayed in Times New Roman Italic font of size 9 and color red. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article or apparatus that comprises, has, includes, contains a list of elements does not include only those elements but may include other elements not expressly listed or inherent to such process, method, article, or apparatus. An element proceeded by "comprises . . . a", "has . . . a", "include . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed. Also, the sequence of steps in a flow diagram or elements in the claims, even when preceded by a letter does not imply or require that sequence.

Moreover, an embodiment can be implemented as a computer-readable storage medium having computer readable code stored thereon for programming a computer (e.g., comprising a processor) to perform a method as described and claimed herein. Examples of such computer-readable storage medium include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for displaying a message destined for different recipients, the method comprising:
    a messaging device performing:
    determining that a message is destined for a first recipient and a second recipient;
    determining a message size limit for the message based on capabilities of a first device used by the first recipient and a second device used by the second recipient;
    during the composing of the message, displaying a first portion of the message in a first font, color, or size of the message characters when a length of the message is less than the message size limit;
    when the length of the message exceeds the message size limit during the composing of the message, displaying a next portion of the message in a second different visible font, color, or size; and
    wherein the first font, color, or size appears different than the second visible font, color or size.

2. The method of claim 1 further comprising providing a warning when the length of the message exceeds the message size limit.

3. The method of claim 2, wherein providing the warning comprises displaying a warning message.

4. The method of claim 2, wherein the warning indicates that the next portion of the message having the second visible font, color, or size will not be sent to one of the two devices.

5. The method of claim 4, wherein the warning indicates that the next portion of the message having the second visible font, color, or size will not be sent to the device having a smaller maximum message size.

6. The method of claim 1 further comprising:
    sending the message without the next portion having the second visible font, color, or size to the device having a smaller maximum message size;
    sending the first and next portions of the message to the other device.

7. The method of claim 1, wherein determining the message size limit for the message comprises:
    determining a maximum message size for the first device;
    determining a maximum message size for the second device;
    setting the message size limit as the smaller of the maximum message size limits of the first and second devices.

8. The method of claim 1, wherein the method is performed in response to at least one of:
    a user creating a new message with the messaging device;
    a user opening an existing message with the messaging device;
    a user inputting into the messaging device an address for the first recipient or an address for the second recipient;
    a user creating a reply message using the messaging device.

9. The method of claim 1 further comprising determining the capabilities of the first device and the second device based on an address for the first device and an address for the second device.

10. The method of claim 1 further comprising:
    determining a first device type of the first device and a second device type of the second device;
    determining the capabilities of the first device based on the first device type and the capabilities of the second device based on the second device type.

11. The method of claim 10, wherein the first device type is determined based on an address of the first recipient, and the second device type is determined based on an address for the second recipient.

12. A non-transitory computer-readable storage element having computer readable code stored thereon for programming a computer to perform a method for displaying a message destined for different recipients, the method comprising:
    determining that a message is destined for at least two different recipients;
    determining a message size limit for the message based on a device type of devices used by each of the recipients;
    displaying a first portion of the message in a first font, color, or size when a length of the message is less than the message size limit;
    when the length of the message exceeds the message size limit, displaying a next portion of the message in a second different font, color, or size;
    wherein the first font, color, or size appears different than the second visible font, color or size.

13. The storage element of claim 12, wherein the method further comprising determining the device type of the devices used by each of the recipients based on an address for each recipient.

14. The storage element of claim 12, wherein the method further comprising providing a warning when the length of the message exceeds the message size limit.

15. The storage element of claim 14, wherein providing the warning comprises displaying a warning message.

16. The storage element of claim 14, wherein the warning indicates that the next portion of the message having the second visible font, color, or size will not be sent to at least one of the devices used by the recipients.

17. The storage element of claim 16, wherein the warning indicates that the next portion of the message having the second visible font, color, or size will not be sent to a set of the devices having a smallest maximum message size.

18. The storage element of claim 12, wherein the method further comprising:

sending the message without the next portion having the second visible font, color, or size to a set of the devices having a smallest maximum message size;

sending the first and next portions of the message to the remaining devices.

19. The storage element of claim 12, wherein determining the message size limit for the message comprises:

determining a maximum message size for each of the devices used by the recipients;

setting the message size limit as the smallest of the maximum message size limits of all the devices.

* * * * *